(12) United States Patent
Douglas et al.

(10) Patent No.: US 8,186,215 B2
(45) Date of Patent: May 29, 2012

(54) METHOD AND SYSTEM FOR DETERMINING NON-UNIFORMITY CHARACTERISTICS OF A VEHICLE TIRE AND RIM

(75) Inventors: Michael Wayne Douglas, St. Charles, MO (US); William B. Feero, St. Louis, MO (US)

(73) Assignee: Hunter Engineering Company, Bridgeton, MO (US)

( * ) Notice: Subject to any disclaimer, the term of this patent is extended or adjusted under 35 U.S.C. 154(b) by 329 days.

(21) Appl. No.: 12/478,904

(22) Filed: Jun. 5, 2009

(65) Prior Publication Data

US 2009/0301192 A1 Dec. 10, 2009

Related U.S. Application Data (60) Provisional application No. 61/059,846, filed on Jun. 9, 2008.

(51) Int. Cl.
*G01M 1/16* (2006.01)
(52) U.S. Cl. .......................................... 73/460
(58) Field of Classification Search ............ 73/458, 73/459, 460–462
See application file for complete search history.

(56) References Cited

U.S. PATENT DOCUMENTS

| | | | |
|---|---|---|---|
| 4,366,707 A * | 1/1983 | Jarschel | 73/146 |
| 5,448,910 A * | 9/1995 | Yurjevich et al. | 73/146 |
| 6,237,234 B1 | 5/2001 | Jackson et al. | |
| 6,336,364 B1 * | 1/2002 | Parker et al. | 73/462 |
| 6,481,282 B2 * | 11/2002 | Douglas et al. | 73/461 |
| 6,799,460 B1 | 10/2004 | Parker et al. | |
| 7,213,451 B2 * | 5/2007 | Zhu et al. | 73/146 |
| 7,320,248 B2 * | 1/2008 | Douglas | 73/459 |
| 7,574,913 B2 * | 8/2009 | Gerdes et al. | 73/468 |
| 7,594,436 B2 * | 9/2009 | Gerdes et al. | 73/459 |
| 7,881,879 B2 * | 2/2011 | Douglas et al. | 702/34 |

OTHER PUBLICATIONS

Vibration Diagnosis—Tire/Wheel Runout; TSB 07-4-5, Ford Motor Company Online Publication, Feb. 14, 2007 (3 pages).

* cited by examiner

*Primary Examiner* — Lisa Caputo
*Assistant Examiner* — Octavia Davis-Hollington
(74) *Attorney, Agent, or Firm* — Armstrong Teasdale LLP (57) ABSTRACT

A method and system for a wheel assembly service system are provided. The system includes a rotatable spindle configured to receive a wheel assembly wherein the wheel assembly includes at least a rim and a tire. The system further includes a load device configured to apply a load to the tire during a rotation of the wheel assembly on the spindle, and a controller configured to determine a first force variation vector of the wheel assembly, initiating rotation of the tire with respect to the rim, determine a second force variation vector of the wheel assembly with the tire rotated with respect to the rim, and determine a force variation of at least one of the tire and the wheel using the first and second force variation vectors. The system also outputs at least one of the determined force variation vector values.

20 Claims, 7 Drawing Sheets

METHOD AND SYSTEM FOR DETERMINING NON-UNIFORMITY CHARACTERISTICS OF A VEHICLE TIRE AND RIM

CROSS REFERENCE TO RELATED APPLICATIONS

This application claims the benefit of U.S. Provisional Application Ser. No. 61/059,846 filed Jun. 9, 2008.

BACKGROUND OF THE INVENTION

This invention relates generally to vehicle wheel service systems and, more particularly, to a method and system for determining vehicle wheel runout and correcting for mismatched wheel assembly runout.

At least some known vehicles experience vibration at road speeds due to non-uniformity in the vehicle's wheel assemblies. The wheel assembly includes a tire coupled to a rim. The non-uniformity may be due to imperfections or damage to the rim and/or tire. The non-uniformity may include a spring rate variation in the tire. The spring rate variation relates to a tire's stiffness at areas spaced about the circumference of the tire. As the stiff area rotates into contact with the road, the tire reacts differently than at other areas of the tire. This difference produces a force variation at a rotational speed of the tire, leading to a first harmonic vibration. Force variation is measured while the inflated tire is rolled against an instrumented drum.

Force variation can be measured while the inflated tire is rolled against an instrumented drum or roller. The prior art can also remount the tire at an optimal position relative to the rim during a matching procedure to reduce or eliminate force variation as an assembly. Other prior art can measure unloaded runout using contactless measurement and optimally position the tire relative to the rim based on runout instead of force variation. These matching procedures (on systems with or without a load roller) require measurement of rim runout. The measured rim contribution is then subtracted from the measured assembly result, yielding a tire-only contribution to the assembly effect. Rim runout is typically measured with the tire mounted for convenience reasons, but there are problems associated with measuring runout in this manner. Many of today's wheels do not provide a proper surface to measure rim runout with the tire mounted, and removal of the tire to measure the bare rim directly at the bead seats is too labor intensive for many customers. An additional problem is that errors can happen with both contact and non-contact rim runout measurement with the tire mounted because the physical bead seat is not what is being measured. For example, the bead seats on an aluminum wheel could be machined at the last manufacturing step, resulting in a surface which does not correlate to any of the external rim surfaces accessible by runout measuring devices when the tire is mounted. Another situation can exist where the rim width varies along different angular locations of the rim as shown by the two extreme rim lip positions 160 and 160a of FIG. 2. The narrower sections squeeze the beads closer together, altering the geometric positioning of the tire carcass and correspondingly the assembly radial force variation. The prior art measures lateral rim runout but only as an audit to check the rim, but in the event that tire construction details were to be made known to the wheel service system the lateral rim runout could be used to predict the effect on assembly radial force variation.

The present invention provides a way to determine the contributions of the tire and rim individually without measuring rim runout at all, avoiding the aforementioned drawbacks and providing a more accurate result.

BRIEF DESCRIPTION OF THE INVENTION

In one embodiment, a wheel assembly service system includes a rotatable spindle configured to receive a wheel assembly wherein the wheel assembly includes at least a rim and a tire. The system further includes a load device configured to apply a load to the tire during a rotation of the wheel assembly on the spindle, and a controller configured to determine a first force variation vector of the wheel assembly, initiate rotation of the tire with respect to the rim either automatically or by a prompt to the user, determine a second force variation vector of the wheel assembly with the tire rotated with respect to the rim, and determine the force variation component due to the tire and the component due to the rim.

In another embodiment, a method of determining non-uniformity of a wheel assembly wherein the wheel assembly includes a rim and a tire is provided. The method includes determining a first force variation vector of the wheel assembly, rotating the tire with respect to the rim, determining a second force variation vector of the wheel assembly, determining a force variation component due to the tire and the component due to the rim.

In yet another embodiment, a wheel assembly-service system includes a spindle configured to receive a wheel assembly wherein the wheel assembly includes a rim and a tire mounted on the rim. The spindle configured to rotate the wheel assembly about a rotational axis of the wheel assembly. The wheel assembly-service system further includes a load device configured to apply a load to the tire, the load simulating a road force experienced by the wheel assembly in use and a controller communicatively coupled to the spindle and the load device. The controller is configured to control a rotation of the spindle and a force applied to the wheel assembly using the load device. The controller is further configured to determine a first force variation vector of the wheel assembly, initiate rotation of the tire with respect to the rim either automatically or by a prompt to the user, determine a second force variation vector of the wheel assembly with the tire rotated with respect to the rim, determine a force variation component due to the tire and the component due to the rim.

BRIEF DESCRIPTION OF THE DRAWINGS

FIGS. 1-7 show exemplary embodiments of the method and system described herein.

DETAILED DESCRIPTION OF THE INVENTION

The following detailed description illustrates embodiments of the invention by way of example and not by way of limitation. It is contemplated that the invention has general application to determining non-uniformity of multiple components of an assembly by measuring a parameter of the assembly in industrial, commercial, and consumer applications. Non-uniformity may include, but is not limited to, force variation and runout.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Figure 1:
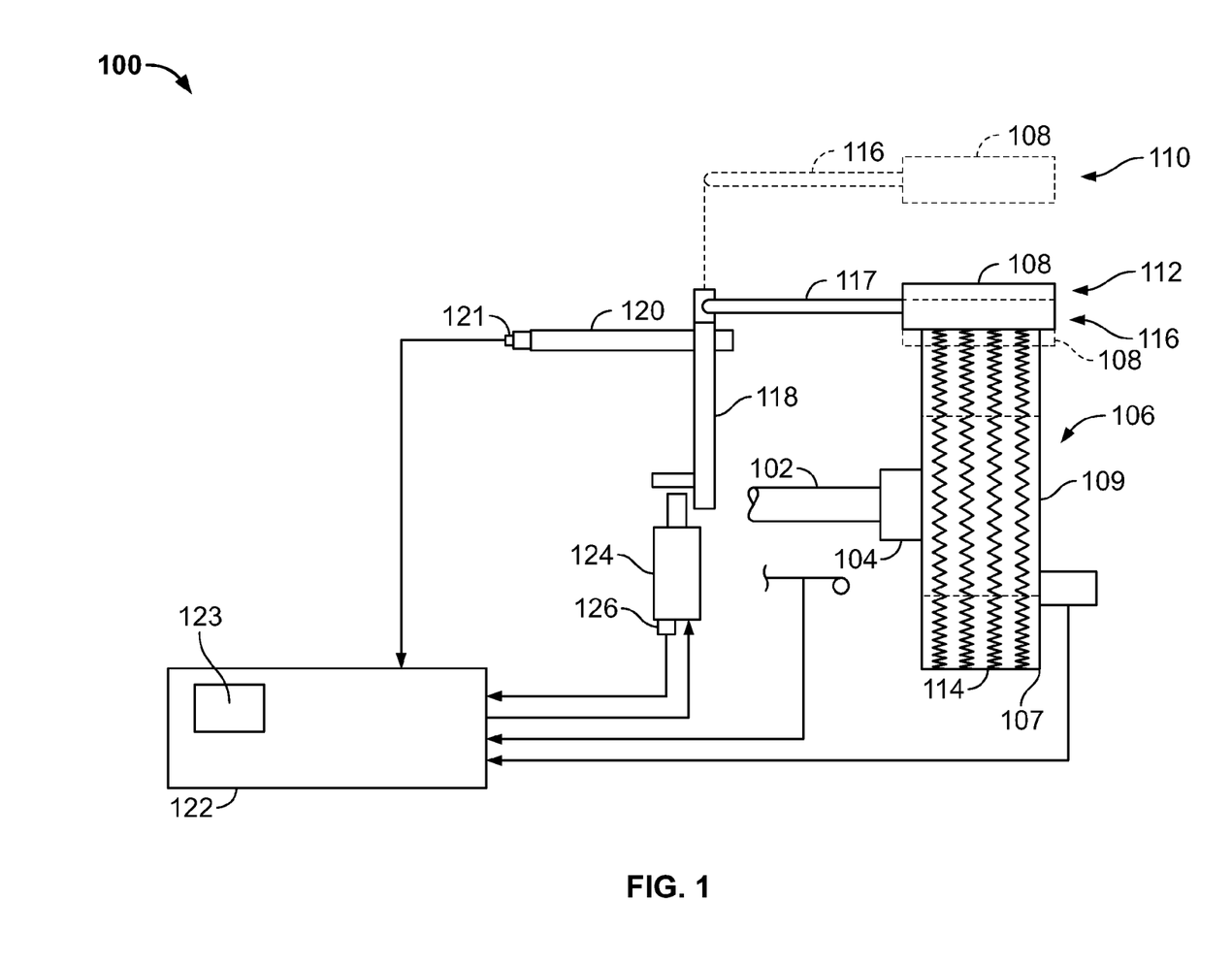
FIG. 1 is schematic diagram of a wheel service system in accordance with an embodiment of the present invention.

FIG. 1 is schematic diagram of a wheel service system 100 in accordance with an embodiment of the present invention. In one embodiment, wheel service system 100 comprises a balancer including a rotatable shaft or spindle 102 driven by a drive mechanism (not shown) such as an electric motor. A shaft encoder 104 is mounted on spindle 102 to provide speed and rotational position information regarding spindle 102. A wheel assembly 106 under test generally comprises a tire 107 coupled to a rim 109 and is removably mounted for rotation to spindle 102.

A load roller 108 is positionable adjacent wheel assembly 106. In a first position 110, load roller 108 is maintained a distance away from wheel assembly 106. In a second position 112, load roller 108 is maintained in light contact with wheel assembly 106 such that load roller 108 contacts an outer peripheral surface 114 of wheel assembly 106 but does not apply a substantial force to wheel assembly 106. As used herein, "light contact" refers to just enough force to enable load roller 108 to track along surface 114. In a third position 116, load roller 108 engages wheel assembly 106 such that a radially inward force is applied to surface 114. The magnitude of the force depends on the position of load roller 108 relative to wheel assembly 106. Load roller 108 is coupled to a shaft 117 which in turn is coupled to an arm 118 configured to pivot about a shaft 120. A sensor 121 detects an amount and direction of rotation of shaft 120. A controller 122 is communicatively coupled to an air cylinder or air bag 124. Controller 122 includes a memory 123 for storing data and/or a program that is executable by controller 122 for implementing the procedures described herein. Controller 122 directs arm 118 to pivot to place load roller 108 into any of various positions described above by actuating air cylinder 124. Air pressure to cylinder 124 is variably adjusted by controller 122. A sensor 126 provides air pressure feedback that enables precise load roller forces to be generated.

In another embodiment, wheel service system 100 comprises a tire changer.

Figure 2:
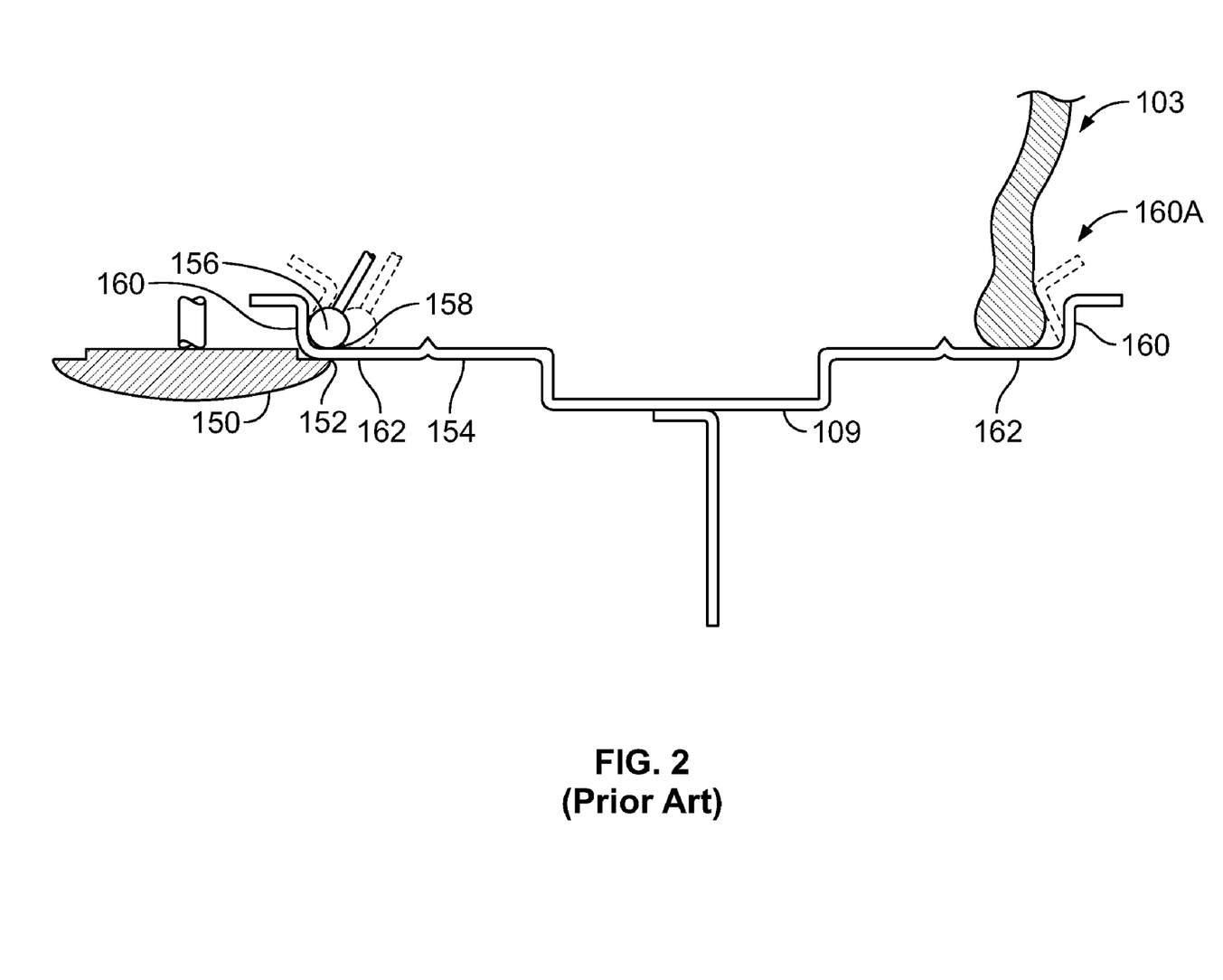
FIG. 2 is a cross-sectional view of rim illustrating known runout measurement methods.

FIG. 2 is a cross-sectional view of rim 109 illustrating known runout measurement methods. In one method of measuring rim runout, an index roller 150 is manually engaged to a lip 152 on a rim flange 154. Rim 109 is rotated slowly while index roller 150 is maintained in engagement with lip 152. A position indicator (not shown) coupled to index roller 150 determines a position of roller 150 to measure a runout of rim 109. Index roller 150 engaging an outside portion of rim 109 can not accurately measure a lateral lip runout on some wheels, including many modern wheels. Index roller 150 must be used with tire 107 installed on rim 109. With tire 107 removed, a ball probe 156 is manually positioned in a bead seating area 158 of rim 109. Rim 109 is rotated slowly while ball probe 156 is maintained in engagement with bead seating area 158. Rim width variation occurs when a radially outwardly extending bead wall 160 is bent inwardly 160a towards tire 107. The narrower sections squeeze the beads closer to each other, altering the geometric positioning of the tire carcass and correspondingly the assembly force variation. The effect on the assembly force variation also depends on the construction type of the tire (aspect ratio, size, stiffness, etc.) and therefore can be difficult to predict even if a rim runout system can obtain lateral measurements along with the radial measurement. Conversely, using the procedure described herein using a first assembly measurement and a second assembly measurement where tire 107 is rotated 180° (but can be an angle other than 180° as long as the angle is known to the wheel service system) with respect to rim 109, the effects of rim width variation and any other non-pure radial rim imperfections are naturally built into the result.

Figure 3:
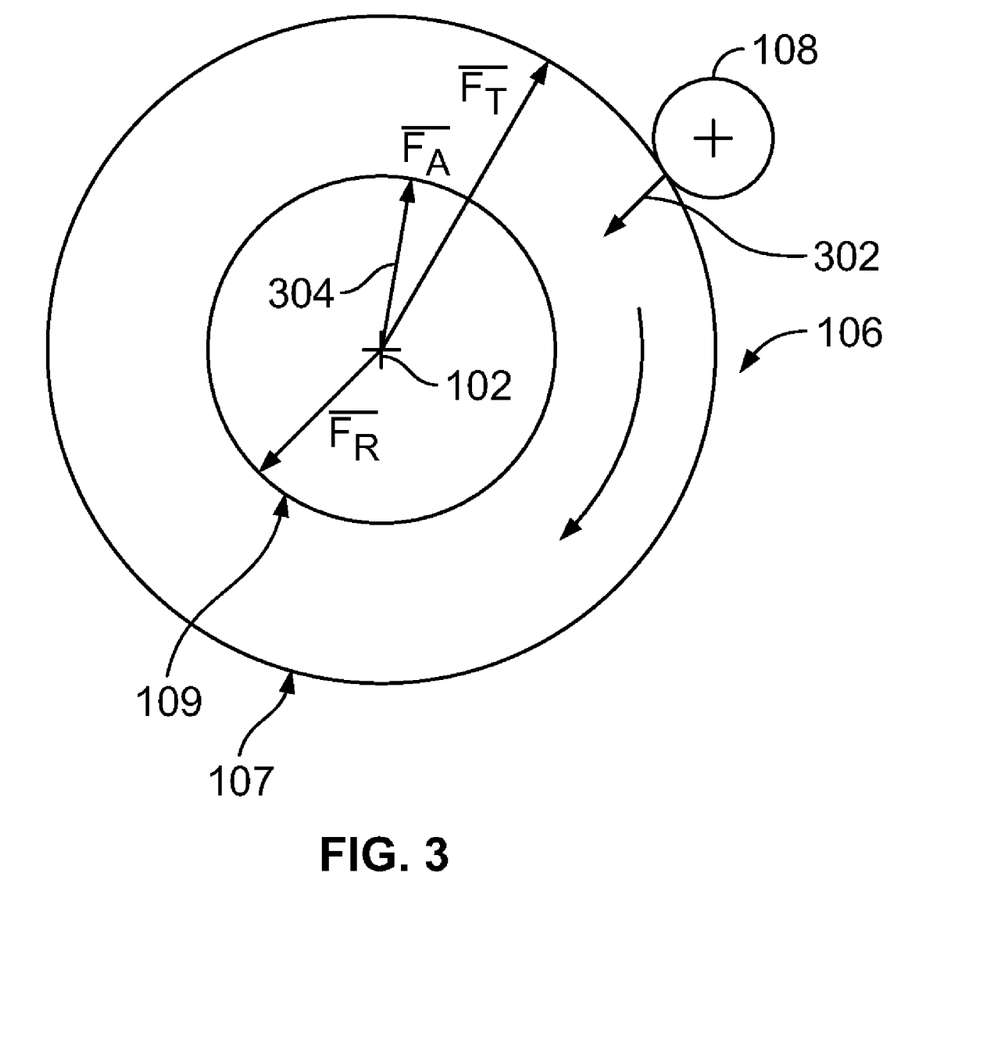
FIG. 3 is a schematic side view of a wheel assembly mounted on a spindle in accordance with an embodiment of the present invention.

FIG. 3 is a schematic side view of wheel assembly 106 mounted on spindle 102 in accordance with an embodiment of the present invention. Wheel assembly 106 includes tire 107 coupled to rim 109. When a radially inward force 302 is applied to tire 107 using load roller 108, a force variation vector 304, comprising a magnitude value and a phase value, may be determined using sensors 121 and/or 126 (shown in FIG. 1). The force vectors are represented by a force vector $F_A$ of the entire wheel assembly 106, a force vector $F_T$ for the tire contribution to $F_A$, and a force vector $F_R$ for the rim contribution to $F_A$.

Figure 4A:
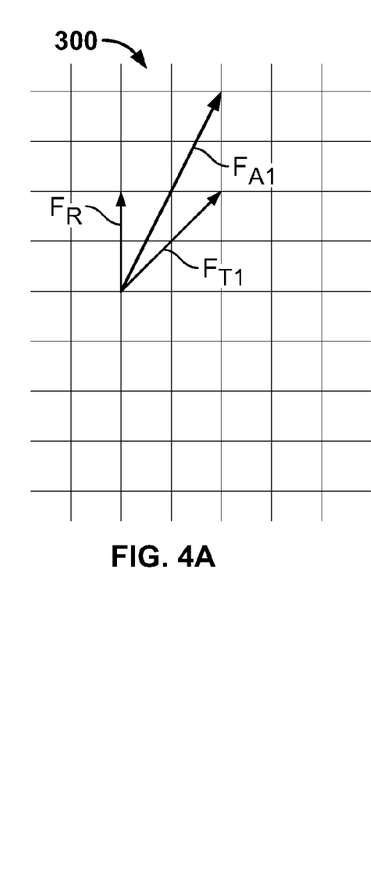
FIG. 4A is a force vector diagram for an exemplary wheel assembly shown in FIG. 1 that may be used with wheel service system.
Figure 4B:
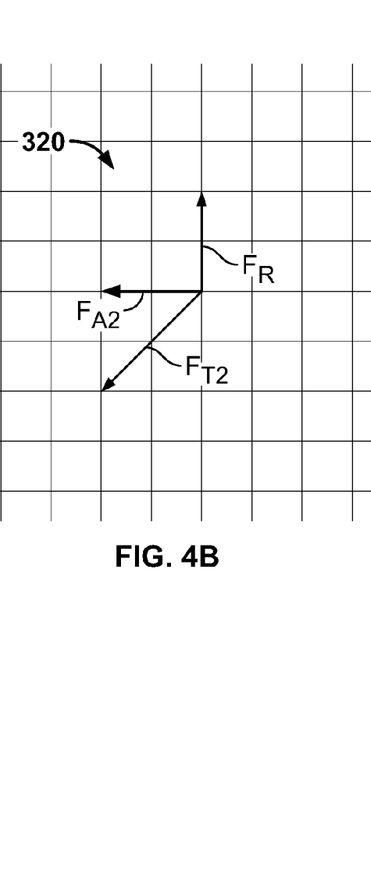
FIG. 4B is a force vector diagram for the wheel assembly shown in FIG. 1 with the tire rotated 180° with respect to the rim.
Figure 4C:
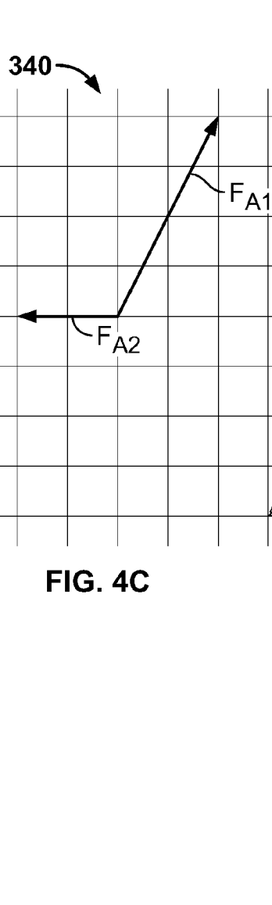
FIG. 4C is a force vector diagram for the wheel assembly shown in FIG. 1 showing the respective measured vectors.
Figure 4D:
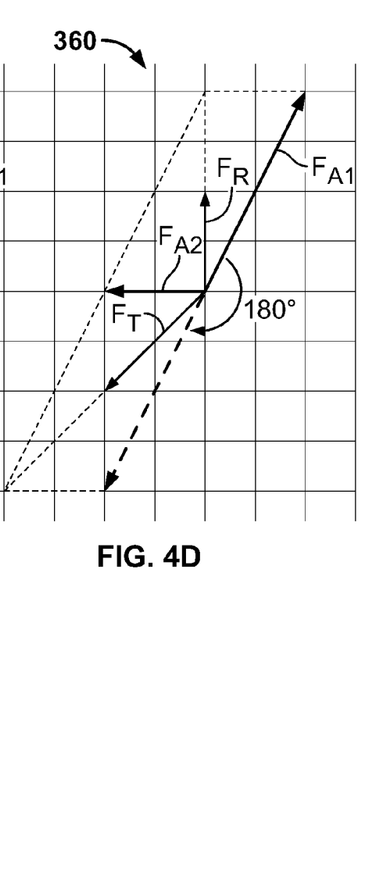
FIG. 4D is a force vector diagram for the wheel assembly shown in FIG. 1 illustrating resolving the component vectors of the measured vectors shown in FIG. 4C.

FIG. 4A is a force vector diagram 300 for an exemplary wheel assembly 106 that may be used with wheel service system 100. FIG. 4B is a force vector diagram 320 for wheel assembly 106 with tire 107 rotated 180° with respect to rim 109. FIG. 4C is a force vector diagram 340 for wheel assembly 106 showing the respective measured vectors. FIG. 4D is a force vector diagram 360 for wheel assembly 106 illustrating resolving the component vectors of the measured vectors shown in FIG. 4C. An initial force vector $F_{A1}$ of wheel assembly 106 is measured using wheel service system 100. Vector $F_{A1}$ may be displayed on wheel service system 100 depending on a selection by a user. Component vectors of $F_{A1}$, force vector $F_R$, attributable to a "high spot" in the runout of rim 109 and force vector $F_T$, attributable to a "high spot" in the runout of tire 107, are unknown. FIG. 4B illustrates the force vectors of wheel assembly 106 with tire 107 rotated 180° with respect to rim 109. A second force variation vector $F_{A2}$ is then measured. FIG. 4C illustrates the two measured vectors $F_{A1}$ and $F_{A2}$. FIG. 4D illustrates determining the component vectors $F_R$ and $F_T$. From the determined components, a prediction of the amount of rotation of tire 107 with respect to rim 109 is made to locate the respective "high spots" of tire 107 and rim 109 at positions that are spaced approximately 180° apart on wheel assembly 106. Although the matching procedure is described above using load roller 108 to provide force variation measurements to determine runout of wheel assembly 106, a light contact may be applied by load roller 108 or a non-contact measurement of runout of wheel assembly 106 may be made using a non-contact sensor (not shown). A "light" load roller or non-contact system would base matching on runout, not force variation. In one embodiment, rotation of tire 107 with respect to rim 109 is accomplished using the drive mechanism to rotate rim 109 a determined amount while tire 107 is maintained substantially stationary using for example, but not limited to, a bead breaker or clamping cylinder. The rotation of tire 107 with respect to rim 109 may be accomplished automatically using controller 122 without intervention of the user.

Referring to FIG. 3, to determine force vector $\overline{F_R}$ and force vector $\overline{F_T}$, $\overline{F_{A1}}$ is measured on system 100.

$$\overline{F_{A1}} = \overline{F_R} + \overline{F_T}, \quad (1)$$

where $\overline{F_T}$ and $\overline{F_R}$ are unknown.

Tire 107 is deflated and tire 107 is rotated 180° with respect to rim 109 automatically or by the user. Tire 107 is reinflated and a force vector $\overline{F_{A2}}$ of wheel assembly 106 is measured.

$$\overline{F_{A2}} = \overline{F_R} - \overline{F_T} \quad (2)$$

Because tire 107 is 180° out of phase with respect to its position when measuring $\overline{F_{A1}}$, $\overline{F_T}$ is negative.

Finding the difference between $\overline{F_{A1}}$ and $\overline{F_{A2}}$ yields:

$$\overline{F_{A1}} = \overline{F_R} + \overline{F_T} -$$
$$\overline{F_{A2}} = \overline{F_R} - \overline{F_T}$$
$$\overline{F_{A1}} - \overline{F_{A2}} = 2\overline{F_T},$$

solving for $\overline{F_T}$ yields $$\overline{F_T} = \frac{\overline{F_{A1}} - \overline{F_{A2}}}{2}$$

Substituting for $\overline{F_T}$ in equation 1 yields, $$\overline{F_{A1}} = \overline{F_R} + \frac{\overline{F_{A1}} - \overline{F_{A2}}}{2},$$

solving for $\overline{F_R}$ yields, $$\overline{F_R} = \frac{\overline{F_{A1}} + \overline{F_{A2}}}{2}.$$

With $\overline{F_R}$ and $\overline{F_T}$ being known, they can be matched to provide the lowest possible assembly force variation $\overline{F_A}$.

Figure 5:
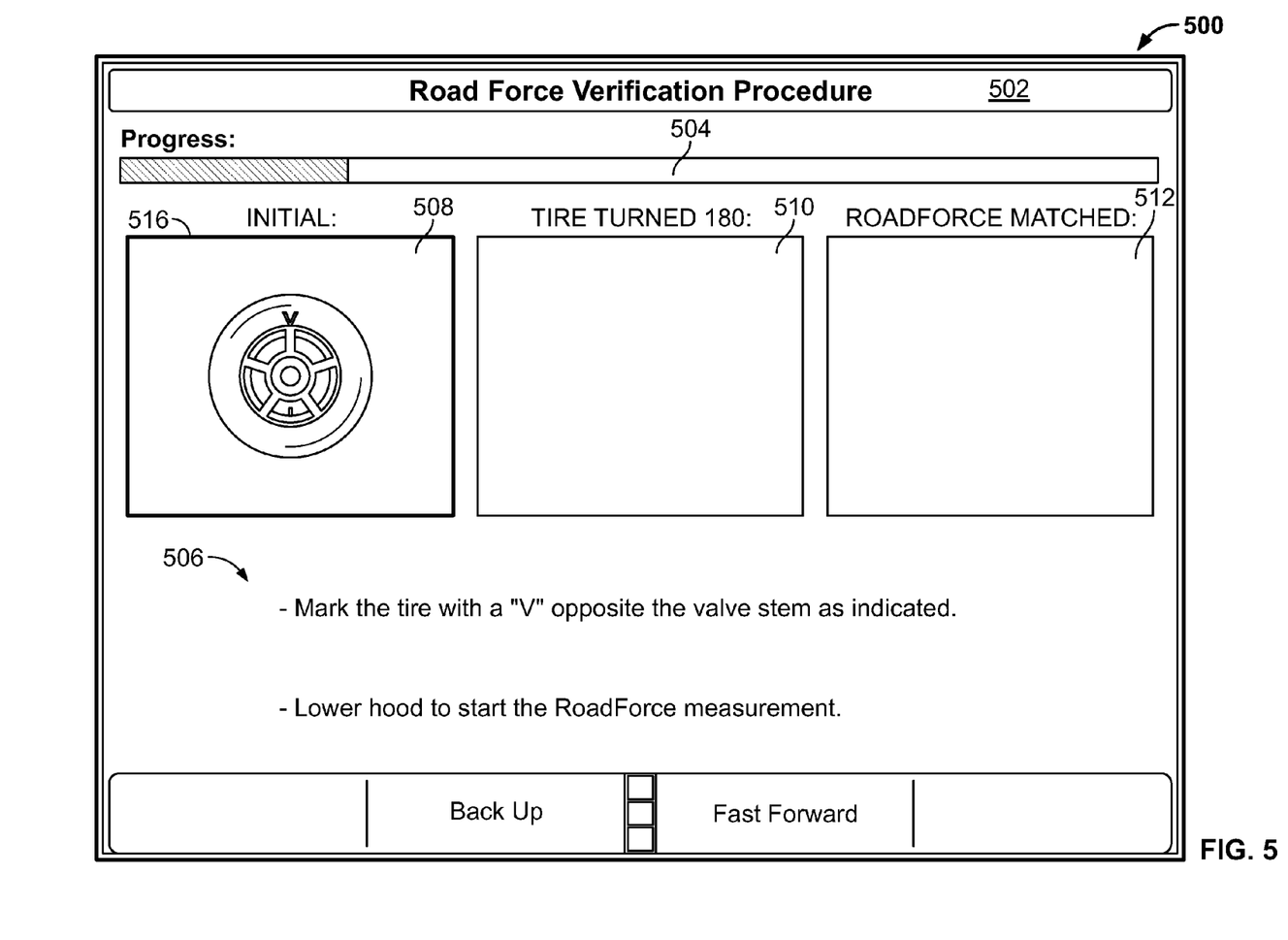
FIG. 5 is another screen display illustrating another step of the procedure that may be used with an exemplary embodiment of the present invention.

FIG. 5 is a screen display 500 that may be used with an exemplary embodiment of the present invention. Screen display 500 may include a title block 502 to inform the user the procedure currently being implemented by system 100. A progress bar 504 informs the user of an estimate of the elapsed procedure and an estimate of how much of the procedure remains before completion. An instruction area 506 includes step-by-step instructions for the user to implement the procedure, as well as alerts, cautions, data, and help items that facilitate the procedure. Screen display 500 also includes one or more graphics panes 508, 510, and 512 in the present example. A series of softkeys 514 permits the user to make selections and inputs to the program executing the procedure. Graphics panes 508, 510, and 512 include pictures and graphics to assist in explaining the procedure to the user as well as permitting the user to see the progress of the procedure in a graphical form. Graphic pane 508 illustrates what wheel assembly 106 should look like to the user when the steps shown in instruction area 506 are completed. The user is then prompted to indicate the illustrated steps are complete by clicking on an appropriate softkey 514. Graphics panes 508, 510, and 512 may include a highlight, for example, a highlighted border 516 indicating that pane is illustrating the active step. In the exemplary screen display 500, instruction area 506 instructs the user to "Mark the tire with a 'V' opposite the valve stem as indicated" to prepare for 180° rotation. Instruction area 506 further instructs the user to "Lower hood to start the RoadForce measurement."

A further capability of the present invention is to combine imbalance measurement with each of the steps of the procedure that measure assembly force variation (or runout if applicable) with the tire mounted at two different angular positions on the rim. The magnitudes locations (vectors) of the rim and tire contributions to the assembly imbalance can be computed in the same manner as the force variation vectors. With this additional information, intelligent decisions can be made for the final tire remount position on the rim which weigh predictions of both imbalance and force variation (or runout if applicable). For example if the rim is very round (has little to no runout) and the resulting matched prediction will have little to no change at any mounted tire position, then a match rotation could then be considered which will improve the final imbalance of the assemble to save total weight usage when balancing the wheel.

Additionally, the method outlined by the presented invention can be performed with the wheel assembly mounted on the vehicle under a loaded, lightly loaded, or unloaded condition. The wheel service system in this case would provide portable hardware to measure the assembly for the two measurement steps which have the tire mounted at two different positions on the rim. The on-car system could also have combined functionality as an on-car balancer, also having the capability of weighing predictions of both assembly imbalance and assembly runout (or force variation if a loaded system) when computing the optimal tire remount position.

Figure 6:
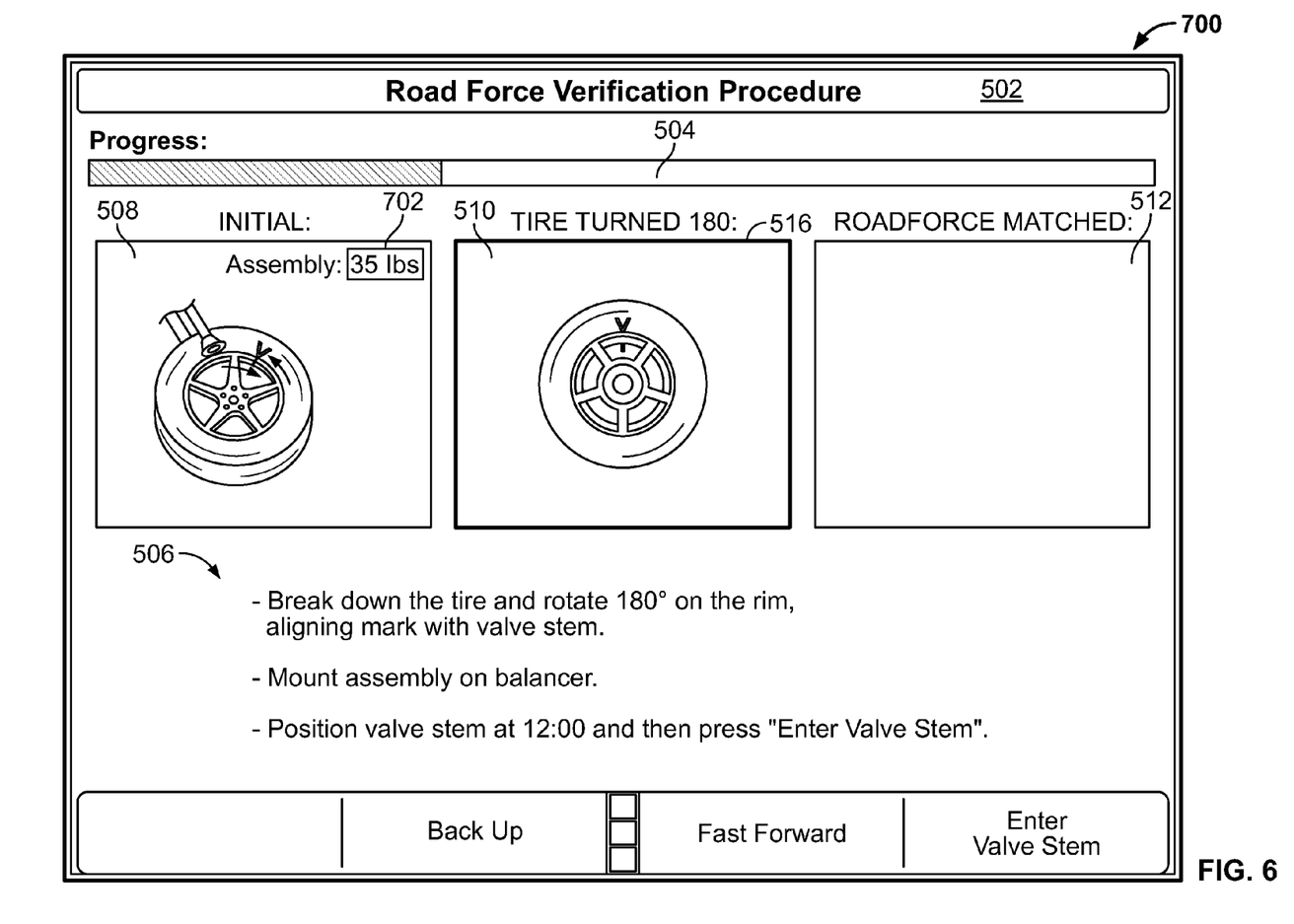
FIG. 6 is another screen display illustrating another step of the procedure that may be used with an exemplary embodiment of the present invention.

FIG. 6 is another screen display 700 that may be used with an exemplary embodiment of the present invention. Instruction area 506 provides further instructions for rotating the tire 180° or may include indications of tire 107 being rotated automatically and graphics panes 508 and 510 illustrate the provided instructions as well as an indication of road force $FA_1$ in a data area 702 of graphics pane 508. In the exemplary screen display 700, instruction area 506 instructs the user to "Break down the tire and rotate 180° on the rim, aligning mark with valve stem." Alternatively, if the rotation of tire 107 is to be performed automatically, instruction area 506 may provide an indication to the user regarding the initiation of the rotation process. Instruction area 506 further instructs the user to "Mount assembly on balancer" and to "Position valve stem at 12:00 and press "Enter Valve Stem.""" An alternate version of the wheel service system could automatically perform the rotation of the tire with respect to the rim, eliminating the need for prompts for this task.

Figure 7:
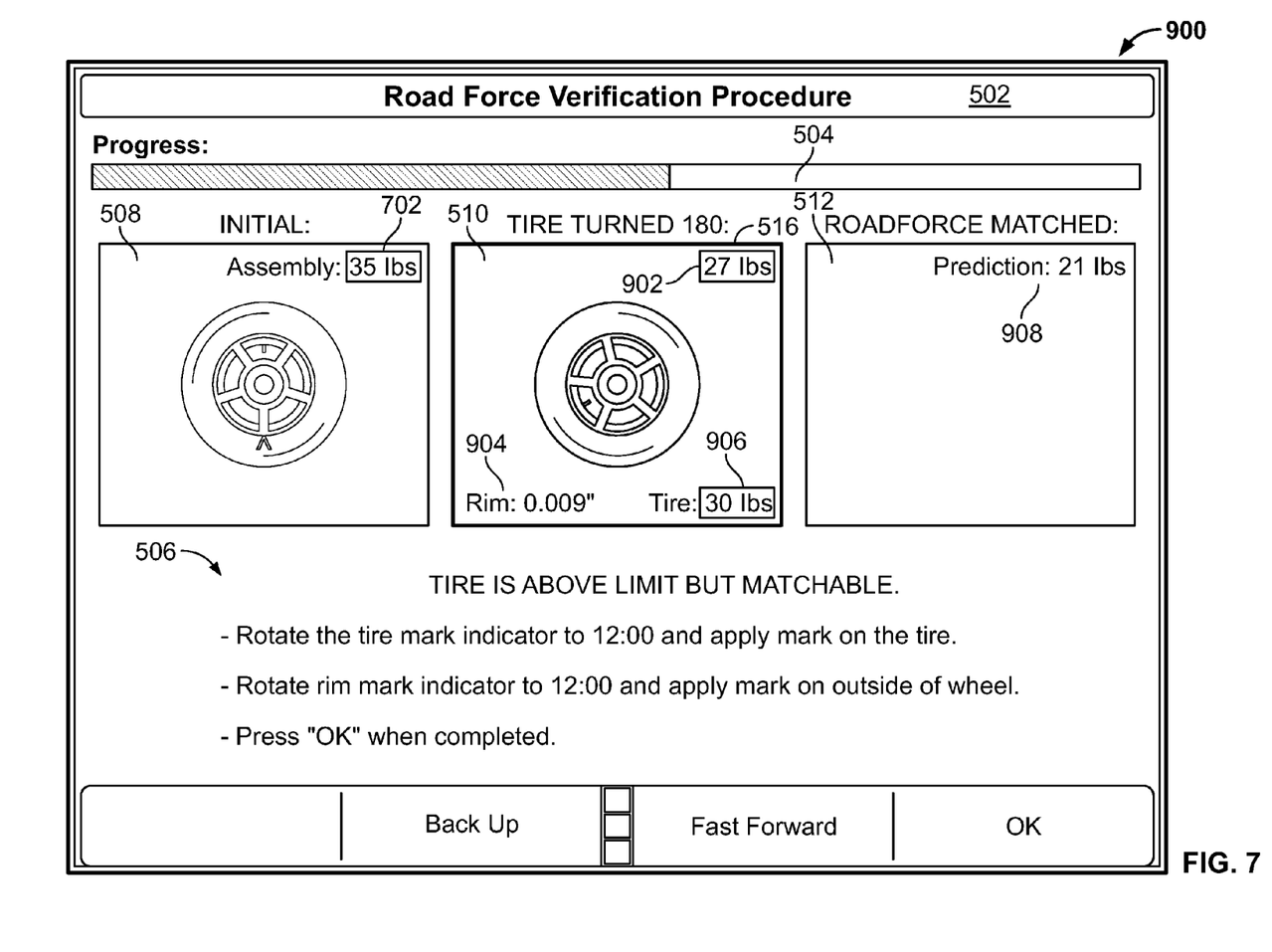
FIG. 7 is another screen display illustrating another step of the procedure that may be used with an exemplary embodiment of the present invention.

FIG. 7 is another screen display 900 that may be used with an exemplary embodiment of the present invention. Instruction area 506 provides further instructions for implementing the procedure. In the exemplary screen display 900, instruction area 506 instructs the user to "Rotate the tire mark indicator to 12:00 and apply mark on the tire." Instruction area 506 also instructs the user to "Rotate rim mark indicator to 12:00 and apply mark on outside of wheel." Instruction area 506 further instructs the user to indicate completion of the step by pressing "OK." Graphics panes 508 and 510 illustrate the provided instructions as well as an indication of road force $FA_1$ in a data area 702 of graphics pane 508 and road force $FA_2$ in a data area 902 of graphics pane 510. A determined runout of rim 109 and a road force of tire 107 are illustrated in data areas 904 and 906, respectively. A data area 908 of graphics pane 512 illustrates a determined prediction of the total road force of wheel assembly 106 when the "high spot" of tire 107 and rim 109 are arranged opposite each other. Instruction area 506 provides a result of the completed road force verification procedure.

The term controller, as used herein, refers to processors, central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory 123 for execution by processor 122, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is measuring a road force and/or runout of a wheel assembly in a first orientation, rotating the tire with respect to the rim and measuring the road force and/or runout of the wheel assembly in the rotated orientation. The processor determines a road force vector attributable to the rim and the tire using the measured road force and/or runout and determines a predicted road force value for the orientation where the "high spot" of the rim and the "high spot" of the tire are aligned opposing each other. This "high spot's" matching is not necessarily matching the physical high spots, but rather providing a match that results in the lowest overall vibration of the matched tire and rim assembly. The processor then compares the predicted value to an allowable value and displays whether the matched tire and rim meets an allowable range. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described embodiments of a method and system of measuring wheel assembly runout and/or road force at two different orientations of the tire on the rim provides a cost-effective and reliable means for determining the runout and/or road force contribution of the rim and of the tire and optionally considering other determined factors such as the rim and tire contributions to assembly imbalance. The determined values may be utilized to predict the final road force and/or runout and/or imbalance. As a result, the methods and systems described herein facilitate matching a tire to a rim such that the wheel assembly meets road force and/or runout specifications in a cost-effective and reliable manner.

While the disclosure has been described in terms of various specific embodiments, it will be recognized that the disclosure can be practiced with modification within the spirit and scope of the claims.

What is claimed is:

1. A wheel assembly service system comprising:
    a rotatable spindle configured to receive a wheel assembly, the wheel assembly comprising at least a rim and a tire;
    a load device configured to apply a load to the tire during a rotation of the wheel assembly on the spindle; and
    a controller configured to:
       determine a first force variation of the wheel assembly;
       initiate rotation of the tire with respect to the rim;
       determine a second force variation of the wheel assembly with the tire rotated with respect to the rim; and
       determine a force variation component associated with the tire utilizing said determined first force variation and said second force variation.

2. A wheel assembly service system in accordance with claim 1 wherein said controller is further configured to determine a force variation component associated with the rim.

3. A wheel assembly service system in accordance with claim 2 wherein said controller is further configured to match a tire to a rim based on their respective force variation components.

4. A wheel assembly service system in accordance with claim 3 wherein said controller is further configured to:
    measure an imbalance of the wheel assembly with each of the first and second determined force variation;
    determine a rim imbalance component and a tire imbalance component using each of said measured imbalances; and
    match the tire to the rim based on the rim imbalance component, the tire imbalance component, and said respective force variation components.

5. A wheel assembly service system in accordance with claim 3, further comprising a memory, wherein said controller is further configured to match a tire to a rim based on respective force variation components retrieved from the memory.

6. A wheel assembly service system in accordance with claim 1 wherein said controller is further configured to:
    compare the determined force variation value of at least one of the tire, the rim and the wheel assembly to an allowable range; and
    output an alert indication if the comparison exceeds a predetermined range.

7. A method of determining force variation attributable to a tire in a wheel assembly wherein the tire is coupled to a rim, the method implemented on a wheel assembly service system including a controller, said method comprising:
    determining a first force variation of the wheel assembly while the tire is in a first rotational position with respect to the rim;
    rotating the tire with respect to the rim to a second rotational position with respect to the rim;
    determining a second force variation of the wheel assembly while the tire is in the second rotational position; and
    determining, with the controller, a force variation component associated with the tire using the determined first force variation and the determined second force variation.

8. A method of determining force variation in accordance with claim 7 further comprising determining a force variation component associated with the rim.

9. A method of determining force variation in accordance with claim 8 further comprising matching a tire to a rim based on their respective force variation components.

10. A method of determining force variation in accordance with claim 9 further comprising:
   measuring an imbalance of the wheel assembly with each of the determined first and second force variations; and
   determining a rim imbalance component and a tire imbalance component using each of the measured imbalances;
   wherein matching a tire to a rim comprises matching a tire to a rim based on the rim imbalance component, the tire imbalance component, and the respective force variation components.

11. A method of determining force variation in accordance with claim 9, the wheel assembly service system further including a memory, and the method further comprising matching a tire to a rim, with the controller, based on respective force variation components retrieved from the memory.

12. A wheel assembly service system comprising:
   a rotatable spindle configured to receive a wheel assembly, the wheel assembly comprising at least a rim and a tire; and
   a controller configured to:
      determine a first non-uniformity of the wheel assembly;
      initiate rotation of the tire with respect to the rim;
      determine a second non-uniformity of the wheel assembly with the tire rotated with respect to the rim; and
      determine a non-uniformity component associated with the tire utilizing said first determined non-uniformity and said second determined non-uniformity.

13. A wheel assembly service system in accordance with claim 12 wherein said controller is further configured to determine a non-uniformity component associated with the rim.

14. A wheel assembly service system in accordance with claim 13 wherein said controller is further configured to match a tire to a rim based on their respective non-uniformity components.

15. A wheel assembly service system in accordance with claim 14 wherein said controller is further configured to:
   measure an imbalance of the wheel assembly with each of said first and second determined non-uniformities;
   determine a rim imbalance component and a tire imbalance component using each of said measured imbalances; and
   match the tire to the rim based on the rim imbalance component, the tire imbalance component, and said respective non-uniformity components.

16. A method for measuring the non-uniformity of a wheel assembly that includes a tire coupled to a rim, said method implemented with a wheel assembly service system including a controller, and said method comprising:
   determining a first non-uniformity of the wheel assembly;
   rotating the tire with respect to the rim;
   determining a second non-uniformity of the wheel assembly with the tire rotated with respect to the rim; and
   determining, with the controller, a non-uniformity component associated with the tire utilizing the determined first non-uniformity and the determined second non-uniformity.

17. A method in accordance with claim 16 further comprising determining a non-uniformity component associated with the rim.

18. A method in accordance with claim 17 further comprising matching a tire to a rim based on their respective non-uniformity components.

19. A method in accordance with claim 17 further comprising:
   measuring an imbalance of the wheel assembly with each said determination of non-uniformity;
   determining a rim imbalance component and a tire imbalance component using each of the measured imbalances; and
   determining a matched orientation of the tire on the rim based on the rim imbalance component, the tire imbalance component, and said respective non-uniformity components.

20. A method in accordance with claim 16 further comprising:
   comparing the determined non-uniformity value of at least one of the tire, the rim, and the wheel assembly to a predetermined allowable range; and
   outputting an indication if the comparison exceeds the predetermined allowable range.

* * * * *